United States Patent
In et al.

(10) Patent No.: US 8,265,045 B2
(45) Date of Patent: Sep. 11, 2012

(54) METHOD FOR POWER CONSUMPTION IN WIRELESS SENSOR NETWORK

(75) Inventors: Jeong-Sik In, Yongin-si (KR); Hyo-Hyun Choi, Seoul (KR); Eui-Jik Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 398 days.

(21) Appl. No.: 12/622,916

(22) Filed: Nov. 20, 2009

(65) Prior Publication Data

US 2010/0124209 A1    May 20, 2010

(30) Foreign Application Priority Data

Nov. 20, 2008  (KR) .................. 10-2008-0115705

(51) Int. Cl.
*H04J 3/00*  (2006.01)
*H04W 4/00*  (2009.01)

(52) U.S. Cl. ........................ 370/337; 370/338
(58) Field of Classification Search .............. None
See application file for complete search history.

(56) References Cited

U.S. PATENT DOCUMENTS

| 7,639,663 | B1 * | 12/2009 | Nerses et al. | 370/347 |
| 2006/0056361 | A1 * | 3/2006 | Jiang et al. | 370/335 |

* cited by examiner

*Primary Examiner* — John Blanton
(74) *Attorney, Agent, or Firm* — The Farrell Law Firm, P.C.

(57) ABSTRACT

A method for reducing power consumption in a wireless sensor network is provided. An optimized path destined for a sink node is set using a common channel in which first and second nodes use a CSMA scheme. A first channel is set and transmission/reception slots for packet transmission/reception are allocated in the first channel. A packet is transmitted to the second node through a first transmission slot using a TDMA scheme. When a packet is not received from the second node through a first reception slot within a first set amount of time, the first reception slot is allowed to transition to an inactive state. The first node is one of the sink node, at least one parent node, and at least one child node of the parent node, and the second node is one of child nodes of the first node.

14 Claims, 10 Drawing Sheets

| ADDRESS | CHANNEL NAME | HOP | SEQUENCE |
|---------|--------------|-----|----------|
| 07 | 3,0 | 1 | 24 |
| 13 | 4,1 | 2 | 31 |
| 17 | 2,3 | 3 | 27 |
| 23 | 1,1 | 2 | 38 |

FIG.4B

METHOD FOR POWER CONSUMPTION IN WIRELESS SENSOR NETWORK

PRIORITY

This application claims priority under 35 U.S.C. §119(a) to an application entitled "Method for Power Consumption in Wireless Sensor Network" filed in the Korean Intellectual Property Office on Nov. 20, 2008 and assigned Serial No. 10-2008-0115705, the content of which is incorporated herein by reference.

BACKGROUND OF THE INVENTION

1. Field of the Invention

The present invention relates generally to wireless sensor networks, and more particularly, to a method for reducing power consumption in a wireless sensor network.

2. Description of the Related Art

In general, a wireless sensor network is installed in an area that is difficult for an operator to manage, such as a comparatively large area, a building, and a structure. The wireless sensor network operates by itself to collect, process, and report environmental information and situation information required by the operator. Therefore, nodes included in the wireless sensor network usually operate using a battery, rather than using an external power supply. However, if there is a node with an exhausted battery in the wireless sensor network, it is often difficult or impossible to replace the exhausted battery of the node with a new battery. Consequently, since the lifetime of the wireless sensor network is determined by the amount of power consumption of a battery, the most important factor to be considered in designing the wireless sensor network is energy efficiency.

Most ad hoc networks including the conventional wireless sensor network employ a Carrier Sense Multiple Access (CSMA) scheme.

The CSMA scheme prevents a transmission error from occurring when two or more nodes simultaneously transmit packets. A corresponding node always monitors whether or not any other nodes are transmitting packets, and transmits a packet only when there are no packets being transmitted by other nodes. If a channel over which a packet is being transmitted is sensed as a result of the monitoring, more specifically, another node is transmitting a packet, then the corresponding node waits for a set time, and then monitors again to determine whether another node is transmitting a packet. Therefore, while a transmitting node using the CSMA scheme can always transmit a packet without restrictions from other conditions when a channel is not used, a receiving node must always be placed in a reception standby state because it does not know when and from which node a transmitted packet will be received.

Among the various operations of a node in a wireless sensor network, the operation of transmitting/receiving a packet is one of the most energy-consuming operations. In a low-speed local area network, such as the wireless sensor network, power required for a node's packet transmission is almost the same as that required for the node's packet reception. Thus, even when the corresponding node is not in the process of packet transmission/reception, but is placed in a reception standby state, it consumes almost the same power as packet transmission/reception. Therefore, in order to reduce the energy consumption of a node in the wireless sensor network, the corresponding node must not be placed in a reception standby state, but in an inactive state for an increased time.

FIG. 1 is a diagram illustrating an operation of transmitting/receiving a packet by each node in a typical wireless sensor network employing the CSMA scheme.

Referring to FIG. 1, portions marked with diagonal lines represent a state where a corresponding node actually participates in packet transmission/reception, shaded portions represent the reception standby state of a corresponding node, and unshaded portions represent the inactive state of a corresponding node.

The portions marked with diagonal lines correspond to portions in which power required for packet transmission/reception is consumed, and all of the shaded portions correspond to portions in which power is wasted. As a result, the power wasted due to the reception standby state increases as the number of nodes increases, or as the density of nodes existing in the same area increases.

In order to reduce the waste of power, the typical wireless sensor network employing the CSMA scheme uses a duty cycling scheme in which active and inactive states are periodically repeated, and communication between nodes is possible only in the active state. In the duty cycling scheme, the ratio of node active state time to the whole time is referred to as "duty cycle". However, even when the duty cycling scheme is applied to the typical wireless sensor network employing the CSMA scheme, there are limitations in reducing power wasted when each node is placed in a reception standby state.

SUMMARY OF THE INVENTION

The present invention has been made to address at least the above problems and/or disadvantages and to provide at least the advantages described below. Accordingly, an aspect of the present invention provides a method for reducing power consumption in a wireless sensor network.

Another aspect of the present invention provides a method for reducing unnecessary power consumption by using a Time Division Multiple Access (TDMA) scheme in a wireless sensor network.

According to one aspect of the present invention, a method is provided for reducing power consumption in a wireless sensor network. A first node sets an optimized path destined for a sink node by using a common channel in which the first node and a second node use a Carrier Sense Multiple Access (CSMA) scheme. The first node sets a first channel for packet transmission/reception to/from child nodes of the first node, and allocates transmission/reception slots for packet transmission/reception to/from the respective child nodes of the first node in the first channel. The first node transmits a packet to the second node, which is allocated a first transmission slot among the transmission slots of the first channel, through the first transmission slot using a Time Division Multiple Access (TDMA) scheme. When a packet is not received from the second node, which is allocated a first reception slot among the reception slots of the first channel, through the first reception slot within a first set amount of time, the first node allows the first reception slot to transition to an inactive state. The first node is one of the sink node, at least one parent node connected to the sink node, and at least one child node connected to the at least one parent node. The second node is one of the child nodes of the first node.

BRIEF DESCRIPTION OF THE DRAWINGS

The above and other aspects, features and advantages of the present invention will be more apparent from the following detailed description when taken in conjunction with the accompanying drawings, in which:

FIG. 4b is a channel table for any node, which is produced according to channel information received on a node-by-node basis, according to an embodiment of the present invention;

DETAILED DESCRIPTION OF EMBODIMENTS OF THE PRESENT INVENTION

Figure 1:
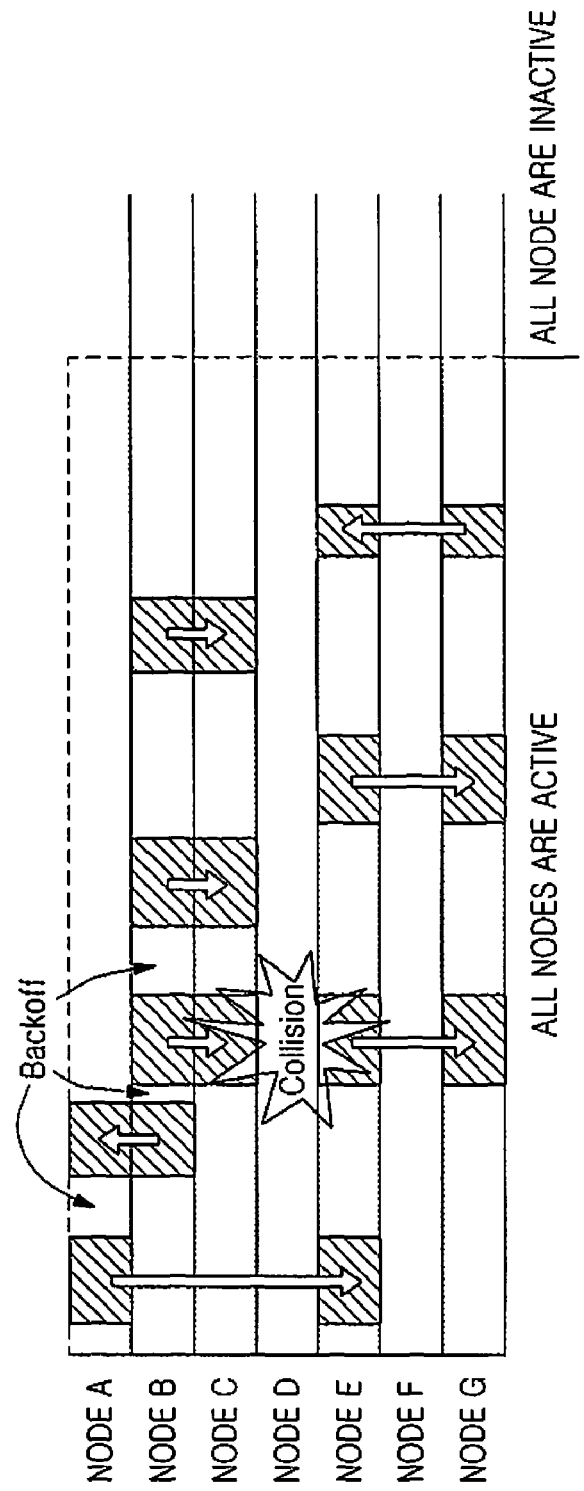
FIG. 1 is a diagram illustrating an operation of transmitting/receiving a packet by each node in a typical wireless sensor network employing a CSMA scheme.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The present invention provides a method for reducing power consumption in a wireless sensor network. Also, the present invention provides a method for reducing unnecessary power consumption by using a TDMA scheme in a wireless sensor network. In the following description, it is assumed that a wireless sensor network to which the present invention is applied includes fixed sensor nodes (hereinafter referred to as "nodes") and one fixed sink node collecting sensing data from the nodes.

An operation of the present invention is largely divided into an "initial network setting process" and an "operation process subsequent to the initial network setting process". Hereinafter, the operation process subsequent to the initial network setting process will be referred to as the "main process".

The initial network setting process includes setting a path from each node to the sink node, allocating a channel and a slot to each node, and time synchronizing the respective nodes to each other. Before the initial network setting process, the CSMA scheme is used because the wireless sensor network is not ready to use the TDMA scheme. Once the initial network setting process is completed, each node performs the main process in which it transmits/receives a packet through a given channel and a given slot. The main process includes the addition of a new node to the wireless sensor network, or the performance of path recovery when a preset path, which has already been set between all the nodes included in the wireless sensor node, is disconnected at any node.

Thus, the initial network setting process includes a path setting and slot allocation step, a channel setting step, a time synchronization step, a scheme switching step (CSMA→TDMA), a new node joining step, a path recovery step, and a communication step using the TDMA scheme.

1. Path Setting and Slot Allocation Step

In an embodiment of the present invention, it is assumed that a Distance Vector (DV) scheme is used as the path setting scheme. However, any other path setting schemes may be used instead of the DV scheme.

When the sink node is first booted, it records its own entry in a routing table, and broadcasts a routing message including the entry to its neighboring nodes. The entry includes three items, specifically, a destination node address for a corresponding node, a next node address, and a hop count. The hop count refers to the number of hops from the corresponding node to the destination node, and the next node address refers to the address of the next node to which the corresponding node transmits a packet in order to transfer the packet to the destination node.

For example, the hop count of the sink node is 0 because the sink node is the destination node, and the destination node address and the next node address are the same as the sink node's own address. Thus, the entry includes only the hop count item for the sink node, and only the hop count item is included in the routing message transmitted from the sink node. Each of the neighboring nodes having received the routing message transmitted from the sink node know that they are within a range of 1 hop from the sink node. These nodes generate a new entry, in which the destination node address and the next node address are recorded as the sink node address and 1 is recorded as the hop count, in its routing table. Subsequently, each of the neighboring nodes transmits a routing message including the new entry to its neighboring nodes.

Each node included in the wireless sensor network performs the above-mentioned operation, and thereby knows how many hops it requires to reach the sink node and to which node it transmits a packet in order to transfer the packet over the shortest distance to the sink node.

Figure 2:
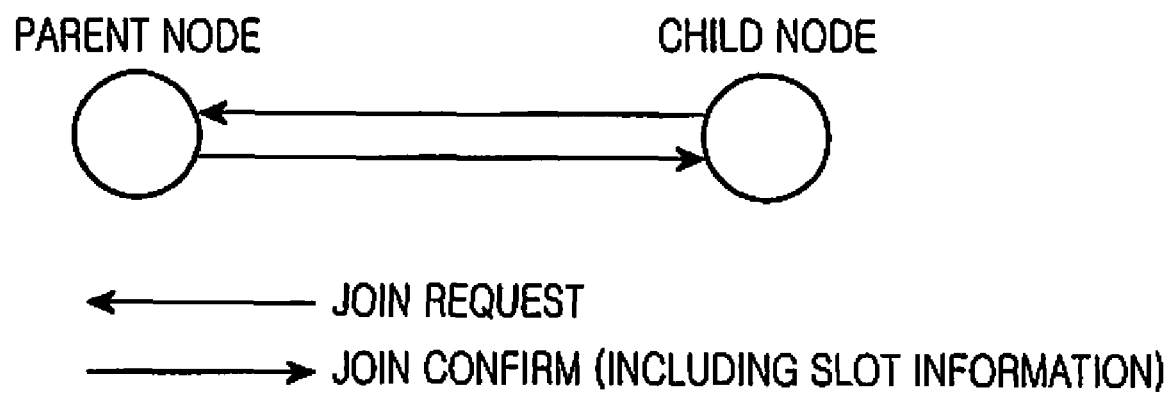
FIG. 2 is a diagram illustrating a node relationship in a wireless sensor network, according to an embodiment of the present invention.

FIG. 2 is a diagram illustrating a node relationship in a wireless sensor network, according to an embodiment of the present invention.

Referring to FIG. 2, the next node for packet transmission from a corresponding node to the sink node is defined as a parent node, and a node that has any node as a parent node is defined as a child node of the parent node.

A corresponding node obtains the node relationship as described in FIG. 2 through the reception of routing messages from its neighboring nodes. Subsequently, when all nodes included in the wireless sensor network obtain the above-defined relationships by exchanging routing messages with their neighboring nodes respectively, each of the nodes, except the sink node, has only one parent node and zero or more child nodes. The sink node has no parent node and has at least one child node. Once all the nodes included in the wireless sensor network obtain the above-defined node relationships, a path is set between the corresponding nodes.

In an embodiment of the present invention, when a node is assigned a parent node for the first time, the parent node may not always be a node providing the shortest path to the sink node. This is caused by packet transmission/reception errors occurring in the wireless sensor network and the randomness of the CSMA scheme. Thus, a node may change an initial path at a later time. If there is no further path change for a set time, each node concludes that its shortest path has been set. If each node receives a routing message from its neighboring node, it checks if the received routing message is received from a node having a shorter path than the currently set path. When the result of the check shows that the routing message is received from a node having a shorter path than the currently set path, the node changes its path to correspond with the routing message. When the result of the check shows that the routing message is not received from a node having a shorter path than the currently set path, the node does not change its path because the currently set path is the shortest path.

Once the shortest path has been set, each node transmits a Join Request (JREQ) message to its parent node. Upon receiving the JREQ message, the parent node records the node having transmitted the JREQ message in its child table for managing child nodes, and then transmits a Join Confirmation (JCNF) message to the child node. By receiving the JCNF message, the child node completes its path setting step. The child node is also allocated a slot from the parent node through the JCNF message. The slot allocated from the parent node may be implemented in various structures.

Figure 3:
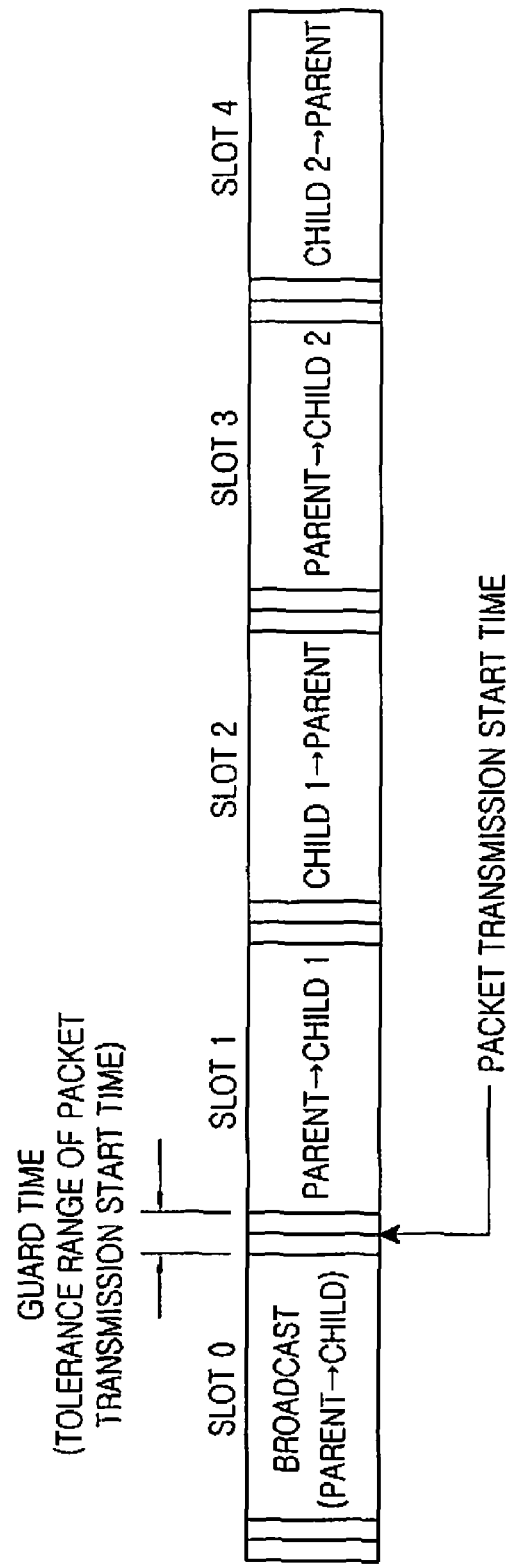
FIG. 3 is a diagram illustrating a structure in which a parent node allocates slots to its child nodes in a wireless sensor network, according to an embodiment of the present invention.

FIG. 3 is a diagram illustrating a structure in which a parent node allocates slots to its child nodes in a wireless sensor network, according to an embodiment of the present invention.

Referring to FIG. 3, the size of each slot corresponds to the sum of the time required to transmit/receive a maximum-sized packet transmittable in the wireless sensor network and a guard time. The guard time refers to a reserve time that allows a reception node to receive a packet even when the corresponding node is not transmitting at the exact time, in consideration of errors in packet transmission/reception time synchronization.

In the structure of FIG. 3, slot 0 is an interval in which the parent node broadcasts the same packet to all the child nodes. When a parent node has child nodes 1 and 2, slot 1 is an interval in which the parent node transmits a packet to child node 1, slot 2 is an interval in which child node 1 transmits a packet to the parent node, slot 3 is an interval in which the parent node transmits a packet to child node 2, and slot 4 is an interval in which child node 2 transmits a packet to the parent node.

Similarly, when there are child nodes that are not allocated slots, the parent nodes allocate the remaining slots as intervals for packet transmission/reception of the child nodes allocated no slots.

Once the step of allocating slots between corresponding parent and child nodes has been completed, the parent and child nodes transmit/receive packets over a channel set therebetween using the allocated slots. It is possible for the slot allocation step and the step of setting a channel for packet transmission/reception between the parent and child nodes to be transposed.

2. Channel Setting Step

In an embodiment of the present invention, the channel setting step refers to a procedure in which each node selects a channel for communication with its child nodes. The channel selected by a corresponding node must be a single channel within the interference range of the corresponding node. Whether or not any two nodes are within an interference range is determined by a hop count between the two nodes. Specifically, when the distance between any two nodes is equal to or less than n hops, the two nodes are determined to be within an interference range. Here, n is a specific integer that is determined according to physical layer characteristics, channel characteristics, node distributions, and so forth.

Physical channels correspond to frequencies, spreading codes, hopping patterns, time intervals, etc., divided according to channel division schemes, and are provided by physical layers. Embodiments of the present invention are based on 16 frequency division channels in a band of 2.4 GHz, which are provided by IEEE 802.15.4, the typical physical and medium access layer standard of the wireless sensor network. However, the physical channel structure of the present invention is not limited thereto. Also, in an embodiment of the present invention, logical channels are also divided by time division, so that a necessary number of logical channels can be ensured regardless of the number of limited physical channels and of a special physical channel division scheme. According to an embodiment of the present invention, a channel allocated to each node is a channel to which logical channel division is applied simultaneously with physical channel division.

Figure 4A:
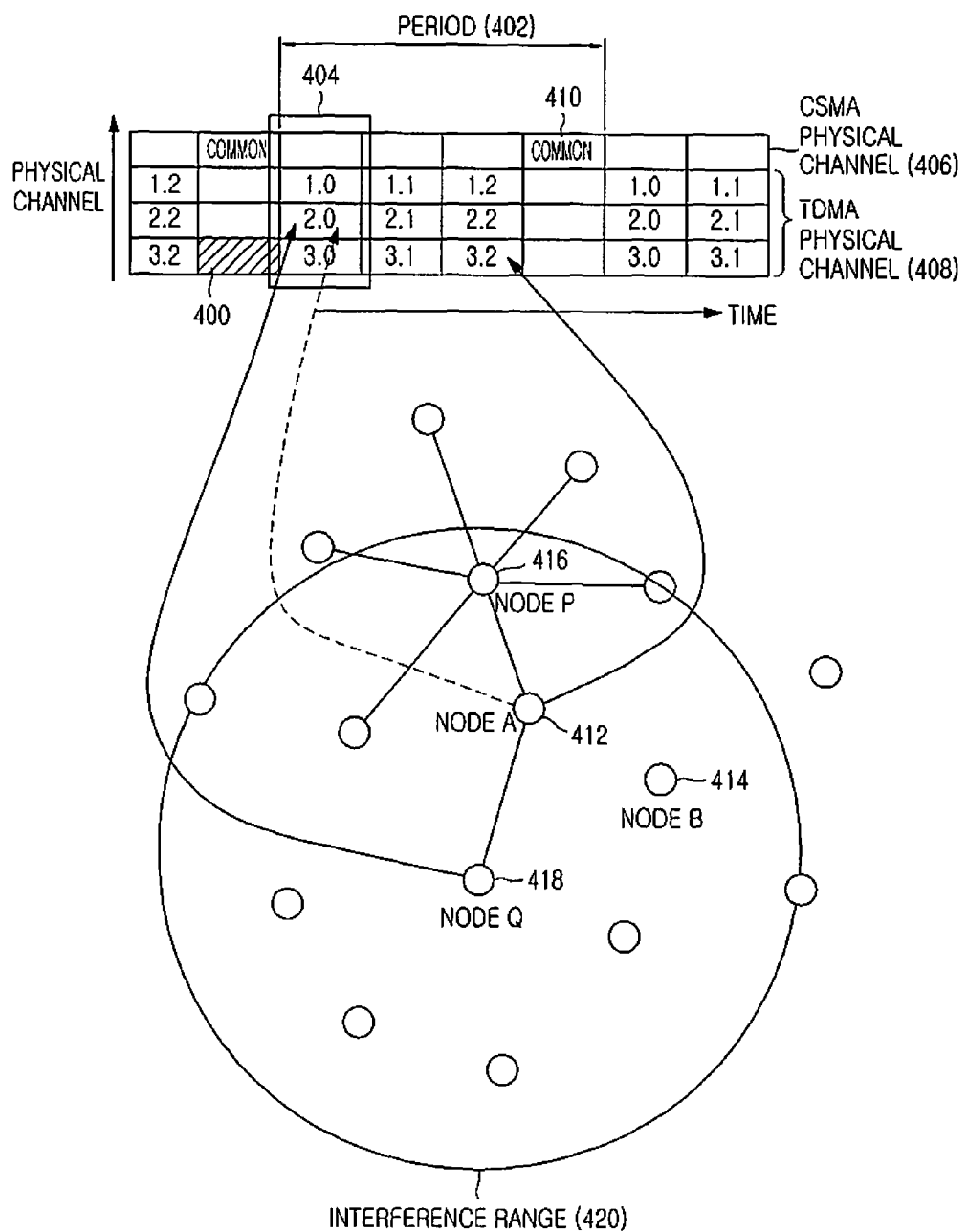
FIG. 4a is a diagram illustrating a channel division scheme, according to an embodiment of the present invention.

FIG. 4a is a diagram illustrating a channel division scheme, according to an embodiment of the present invention.

Referring to FIG. 4A, one divided quadrangle 400 in the graph correspond to one logical channel. A set of logical channels using the same time interval in one period 402 is defined as a column 404, and the name of each channel constituting the column 404 is defined by a pair of a physical channel number and a column number designating the logical channel. A physical channel of the present invention is divided into a first region 406 where CSMA physical channels are allocated and a second region 408 where TDMA physical channels are allocated. The CSMA physical channel refers to a channel to which the CSMA scheme is applied, and the TDMA physical channel refers to a channel to which the TDMA scheme is applied.

In the first region 406, a common channel 410 is allocated in each period 402 for allowing each node to use the CSMA scheme when it transmits/receives a packet for switching to the TDMA scheme in the initial network setting process. Each node selects one TDMA physical channel, which has no overlapping between nodes within an interference range 420, in the initial network setting process, and uses the selected TDMA physical channel in the main process. Use of the common channel and a procedure of allocating different physical channels to the respective nodes within the interference range 420 is described in greater detail below.

It is assumed that the respective nodes within the interference range 420 have been allocated different channels. When node A 412 selects channel (3.2), it communicates with its child nodes over channel (3.2). Node B 414, a child node of node A 412, has been allocated slot 1 of FIG. 3. In slot 1 of channel (3.2), node B 414 is in a reception standby state for receiving a packet transmitted from node A 412. If there is a packet to be transmitted to node A 412, then node B 414 transmits the packet in slot 2 of channel (3.2).

In the same manner, node A 412 communicates with its parent node, node P 416, by using channel (1.0) selected by node P 416 and a slot allocated from node P 416. When node A 412 selects channel (2.0) selected by node Q 418 that is included in the column using the same time interval as channel (1.0) selected by node P 416, there is a problem in that node A 412 must communicate with its child node and simultaneously communicate with its parent node in the same time interval. Therefore, in an embodiment of the present invention, at least two TDMA columns are defined, and a parent node and its child node are prevented from selecting channels in the same column, or more specifically, channels using the same time interval. After a parent node determines its channel, a child node selects its channel from among channels excluding those included in the column having the channel of the parent node. In an embodiment of the present invention, the following channel allocation algorithm is used for nodes within an interference range to select different columns. It is assumed that each node of the present invention knows the above-constructed overall channel structure of FIG. 4A through broadcasting of the sink node or a scheme preset when the network is implemented.

FIG. 4B is a channel table of a node, which is produced according to channel information received on a node-by-node basis, according to an embodiment of the present invention.

Referring to FIG. 4B, each node is provided with a channel table consisting of its own entry and entries for nodes existing within its interference range. Each entry includes four items, specifically, the address of a corresponding node, the name of a channel allocated to the corresponding node (physical channel number, column number), a hop count from the channel table owner node to the corresponding node, and a serial number (sequence).

The channel table of FIG. 4B is owned by node 7. At first, the channel table is vacant because there are no channel tables received from neighboring nodes. Subsequently, if node 7 selects its channel or receives its neighboring nodes' channel tables, it checks if entries included in the received channel tables exist among entries in its channel table. When the result of the check shows that entries exist, node 7 updates the respective item values of the entries of its channel table with those of the corresponding entries of the received channel tables. Starting from the first generation of information in a channel table, each node included in the wireless sensor network periodically broadcasts its channel table to its neighboring nodes.

As mentioned above, each node must first know the channel selected by its parent node in order to select its channel. Thus, each node waits until it knows the channel selected by its parent node. Once each node has completed the setting of its optimized path, it checks if a channel name item value is recorded in the parent node entry of its channel table. When the result of the check shows that there is no channel name item value, each node waits until the channel name item value is generated.

When the channel name item value of the parent node entry exists in its channel table, the node selects one channel having a channel name whose column number is different from that of its parent node channel name. The channel is selected from among channels whose names do not exist in channel name item values of its channel table among all the already known channels available to the wireless sensor network. The node then inserts the selected channel as its own channel into its channel table.

However, when the channel name item value of its parent node does not exist in its channel table or when the node does not receive a channel table, which includes an entry containing the channel name item value of its parent node, from its neighboring node after the setting of its optimized path has been completed, the node cannot know the column number of the channel name selected by its parent node. Thus, the node randomly selects one channel from among channels whose channel names do not exist in channel name item values of its channel table among all the already known channels available to the wireless sensor network, and then inserts the selected channel as its own channel into its channel table. Subsequently, when the node receives a channel table including an entry of the channel name item value of its parent node, it checks if the column number of the randomly selected channel is the same as the column number of the channel name item value contained in the received entry corresponding to its parent node. When the two column numbers are the same, the node reselects a logical channel whose column number is different from that of the channel name item value corresponding to its parent node, from among channels whose names do not exist in channel item values of its channel table among all the already known channels available to the wireless sensor network.

The node initially sets the value of the hop count item to "0" because the channel name item value inserted into its entry of its channel table is its own channel name. It does not matter which value the initial value of the serial number item takes. The value of the serial number item is increased by "1" whenever the node periodically broadcasts its channel table. The serial number denotes an order of generation of channel information in the channel table of a corresponding node. The serial number item values of nodes other than the corresponding node are not changed.

Figure 5:
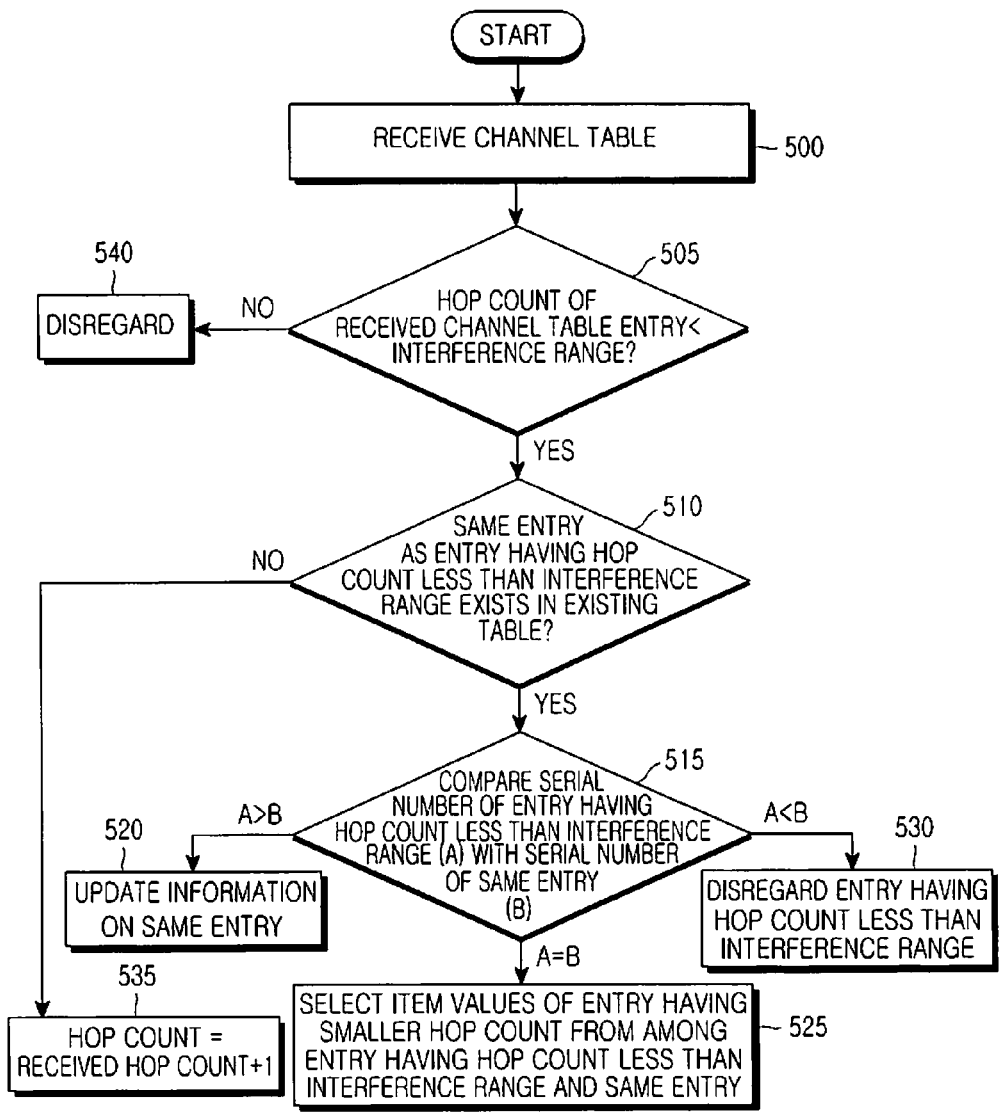
FIG. 5 is a flowchart illustrating a procedure of updating a channel table on receiving node-by-node channel information, according to an embodiment of the present invention.

FIG. 5 is a diagram illustrating a procedure of updating a channel table on receiving node-by-node channel information, according to an embodiment of the present invention.

Referring to FIG. 5, in step 500, if a node receives a channel table from its neighboring node, the methodology proceeds to step 505. In step 505, the node checks if a hop count item value is less than a predetermined hop count corresponding to its interference range for each entry included in the received channel table. As a result of the check, the node disregards entries having hop count item values greater than or equal to the predetermined hop count corresponding to its interference range. When the result of the check shows that there is an entry having a hop count item value less than the predetermined hop count corresponding to its interference range, the node proceeds to step 510. In step 510, the node searches its existing channel table for an entry having the same node address as that of the entry having a hop count item value less than the predetermined hop count corresponding to its interference range. When the result of the search shows that such an entry does not exists in the existing channel table, the node proceeds to step 535. In step 535, the node increases the hop count item value of the entry, which has a hop count item value less than the predetermined hop count corresponding to its interference range, by "1", and then inserts the entry into the existing channel table.

However, when the result of the search in step 510 shows that such an entry exists in the existing channel table, the node proceeds to step 515. In step 515, the node compares the serial number item value of the entry having the same node address with that of the entry having a hop count item value less than the predetermined hop count corresponding to its interference range. When the result of the comparison shows that the serial number item value of the entry having a hop count item value less than the predetermined hop count corresponding to its interference range is greater than that of the searched entry having the same node address, the node proceeds to step 520. In step 520, the node updates the item values of the searched entry having the same node address with those of the entry having a hop count item value less than the predetermined hop count corresponding to its interference range respectively. When the result of the comparison shows that the serial number item of the searched entry having the same node address is equal to that of the entry having a hop count item value less than the predetermined hop count corresponding to its interference range, the node proceeds to step 525. In step 525, the node selects an entry with a smaller hop count item value from among the searched entry having the same node address and the entry having a hop count item value less than the predetermined hop count corresponding to its interference range, and then sets the item values of the corresponding entry to those of the selected entry. When the result of the comparison shows that the serial number item value of the entry having a hop count item value less than the predetermined hop count corresponding to its interference range is less than that of the searched entry having the same address, the node proceeds to step 530. In step 530, the node disregards the entry having a hop count item value less than the predetermined hop count corresponding to its interference range because the entry corresponds to information generated ahead of the searched entry having the same node address.

Through the above-described process, each node can know the channel names of all other nodes that are within a given hop count from it, or more specifically, all other nodes within its interference range that have already selected their channels. When any node selects its channel, it selects a channel, which is absent in its channel table, from among all the channels available to the wireless sensor network, and consequently does not select the same channel as that of any other node within its interference range.

However, after node A selects its channel and before the name of the channel selected by node A reaches another node within the interference range of node A, for example, node B, there is a possibility that node B selects the same channel by chance. After nodes A and B select their channels, each of them recognizes the fact that there is another node having selected the same channel as its own channel. If both nodes A and B change their channels, then there is a possibility that the same channel is selected again. Therefore, an embodiment of the present invention proposes that, among nodes having selected the same channel, only a node having a greater node address item value stored in its channel table changes the selected channel, and a node having a smaller node address item value does not change the selected channel.

Changing the selected channel is the same as the above-described method of selecting a channel. When a node changes its selected channel, the node selects one channel having a channel name whose column number is different from that of its parent node channel name, from among channels whose names do not exist in channel name item values of its channel table, among all the already known channels available to the wireless sensor network. The node then inserts the selected channel as its own channel into its channel table. Subsequently, if channel tables, which include entries overlapping with those of its channel table, are not received from its neighboring nodes and each entry in its channel table does not also experience a change in its channel item values for more than a given time, the node fixes its selected channel to the current channel.

3. Time Synchronization Step

Once channels and slots have been determined between parent and child nodes through the path setting, slot allocation, and channel setting steps described above, it is possible for each node to know when and to which node it may transmit a packet, and when and from which node it may receive a packet. However, for two nodes that are to actually transmit/receive packets, the time when one node transmits a packet must coincide with the time when the other node receives the packet. Therefore, time synchronization is required to make timer values the same for the two nodes. A method for time synchronization between the two nodes is performed such that a child node among the two nodes sets its time on the basis of the time of a parent node.

All nodes in the wireless sensor network perform time synchronization between parent and child nodes after the path setting step. As a result, all the nodes in the wireless sensor network set their times to the time of the sink node. Since there is a slight difference between the clock frequencies of the respective nodes, a time difference occurs as time goes by after the first synchronization, and the more time goes by, the larger such a time difference becomes. Therefore, in the present invention, respective nodes periodically perform time synchronization between parent and child nodes.

4. Scheme Switching Step

Figure 6:
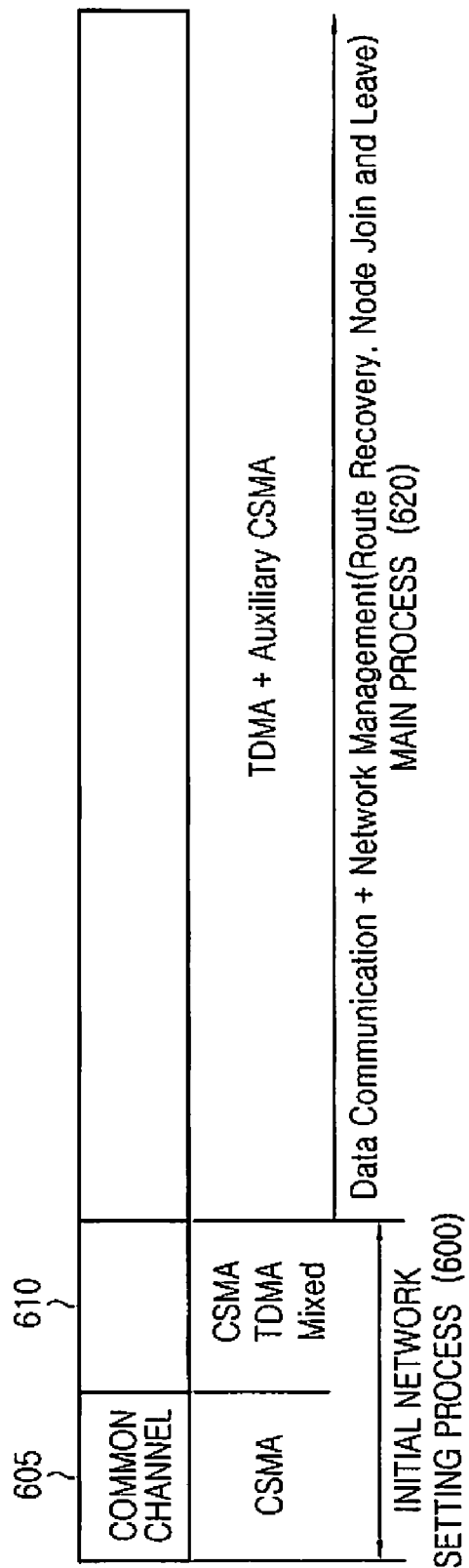
FIG. 6 is a diagram illustrating a procedure in which a wireless sensor network switches from a CSMA scheme to a TDMA scheme, according to an embodiment of the present invention.

FIG. 6 is a diagram illustrating a procedure in which a wireless sensor network switches from a CSMA scheme to a TDMA scheme, according to an embodiment of the present invention.

Referring to FIG. 6, an initial network setting process 600 is divided into a starting point 605 where only the CSMA scheme is used, and a mixed point 610 where the CSMA scheme is used together with the TDMA scheme.

At the starting point 605, all nodes included in the wireless sensor network transmit/receive packets in the CSMA scheme in order to switch to the TDMA scheme. Subsequently, at the mixed point 610, all the nodes included in the wireless sensor network are not ready to use the TDMA scheme.

Once paths have been set for all the nodes and channel and slot allocations to the respective nodes have been completed, all the nodes proceed to the main process 620. In the main process 620, all the nodes transmit/receive packets in the TDMA scheme over their respective channels. Additionally, when a new node joins the wireless sensor network or an existing node misses the already set path, the new node or the existing node temporarily transmits/receives a packet in the CSMA scheme. More specially, in the TDMA scheme, each node must transmit/receive a packet over a given channel at a given time. However, at the mixed point 610 where the CSMA scheme is used together with the TDMA scheme, it may be assumed that one of two nodes transmitting/receiving packets uses the CSMA scheme because it is not yet ready to use the TDMA scheme, and only the other node is ready to use the TDMA scheme. In this case, the two nodes are unable to communicate with each other until the node using the CSMA scheme is ready to use the TDMA scheme. If such a state of inability of packet transmission/reception continues for more than a given time, then a difference between the synchronized tinier values of the two nodes becomes larger, and there is a possibility that the two nodes will remain unable to transmit/receive packets.

In order to prevent this inability, any two nodes having the relationship of parent and child nodes must switch to the TDMA scheme at the same time. However, the parent node may have its own parent node, and the child node may also have its own child nodes. Ultimately, in order to allow any parent node and any child to switch to the TDMA scheme at the same time, all nodes included in the wireless sensor network must switch to the TDMA scheme at the same time. However, this transition becomes more difficult as the size of the wireless sensor network increases.

Accordingly, in an embodiment of the present invention, a specific channel is distributed so that the CDMA scheme can coexist with the TDMA scheme. More specially, in addition to a TDMA physical channel over which to transmit/receive a packet by using the TDMA scheme, a common channel over which to transmit/receive a packet by using the CSMA scheme (common channel 410 of FIG. 4A) is allocated in each period. A physical channel corresponding to the common channel is preset, or is recognized by all nodes in the wireless sensor network through broadcasting of the sink node. No physical channel is arranged in a column including the common channel, or more specifically, the same time interval as the common channel. Also, the duration of the common channel may or may not be the same as that of the TDMA physical channel. Each node included in the wireless sensor network of the present invention transmits a packet to its parent node only through the common channel and does not transmit a packet in other time intervals after time synchronization with its parent node.

Figure 7:
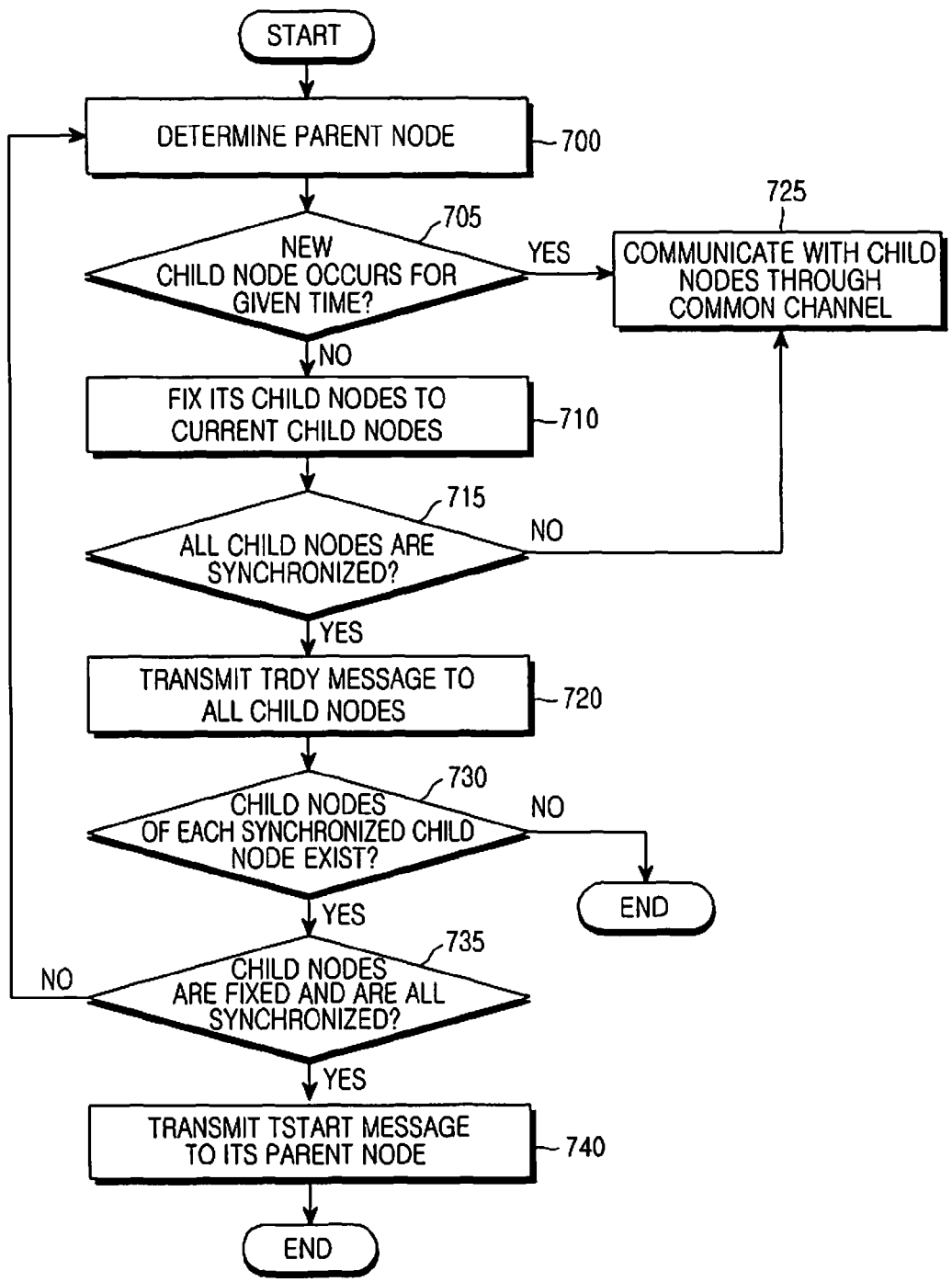
FIG. 7 is a flowchart illustrating a procedure in which each node included in a wireless sensor network changes its packet transmission/reception scheme from a CSMA scheme to a TDMA scheme, according to an embodiment of the present invention.

FIG. 7 is a diagram illustrating a procedure in which each node included in a wireless sensor network changes its packet transmission/reception scheme from the CSMA scheme to the TDMA scheme, according to an embodiment of the present invention. In FIG. 7, it is assumed that any one of the respective nodes included in the wireless sensor network is a first node.

Referring to FIG. 7, in step 700, the parent node of the first node is determined through routing messages received by the first node from its neighboring nodes. In step 705, the first node checks if a new child node occurs for a given time. The first node recognized whether a new child node occurs or not by receiving a JREQ message from any node.

When the result of the check shows that a new child node does not occur, the first node proceeds to step 710. In step 710, the first node fixes its child nodes to only child nodes currently recorded in its child node management table, and then proceeds to step 715. When the result of the check shows that a new child node occurs in a given time, the first node proceeds to step 725.

In step 715, the first node checks if all the fixed child nodes are synchronized with it. When the result of the check shows that all the child nodes are synchronized with the first node, the first node proceeds to step 720. In step 720, the first node transmits a TDMA Scheme Ready (TRDY) to all the synchronized child nodes, thereby informing the child nodes that they may now switch to the TDMA scheme. When the result of the check shows that any one of the child nodes is not yet synchronized, the first node proceeds to step 725. When child nodes of the first node are not yet fixed in step 705 or any child node of the first node is not yet synchronized in step 715, in step 725, the first node maintains using the CSMA scheme through a common channel (410 of FIG. 4A) over the whole time interval because it must receive a packet from a new child node or a child node that is not yet synchronized.

The TRDY message means that the first node is ready to receive packets from its fixed child nodes over a TDMA physical channel that is a specific logical channel selected by the first node. However, any child node of the first node, which has received the TRDY message as in step 720, may maintain using the CSMA scheme to communicate with its child nodes, even after it starts to communicate with the first node by using the TDMA scheme. This is because child nodes of each fixed child node of the first node do not transmit CSMA packets during a time interval corresponding to the TDMA logical channel of the first node.

On receiving the TRDY message, in step 730, each child node of the first node checks if its child nodes exist. When the result of the check shows that child nodes exist, each child node of the first node proceeds to step 735. In step 735, each child node of the first node checks if the checked child nodes are fixed and are all synchronized. When the result of the check shows that the child nodes are not fixed or are not all synchronized, each child node of the first node returns to step 700. When the result of the check in step 730 shows that no child nodes exist, the whole procedure is terminated.

When the result of the check in step 735 shows that the checked child nodes are fixed and are all synchronized, each child node of the first node proceeds to step 740. In step 740, each child node of the first node transmits a TDMA Scheme Start (TSTART) message to the first node, thereby informs the first node that it has switched to the TDMA scheme. Upon transmitting the TSTART message, each child node of the first node communicates with the first node by using the TDMA scheme. If the above procedure is terminated for all nodes included in the wireless sensor network, then each of all the nodes is placed in a state where its child nodes are fixed, and synchronization between the fixed child nodes and the corresponding parent node is completed. Thus, each node enters the main process designated by 620 in FIG. 6, and transmits/receives a packet only by using the TDMA scheme, except for the case where a new node joins the wireless sensor network or the path is recovered.

5. New Node Joining Step

When the initial network setting process is completed, or more specifically, in the main process designated 620 in FIG. 6, all nodes included in the wireless sensor network transmit/receive packets only by using the TDMA scheme. Thus, a new node cannot exchange information necessary for joining the wireless sensor network with existing nodes included in the wireless sensor network, for which the shortest path has been already set. Therefore, there is a need to activate a channel over which new nodes transmit/receive packets to/from the existing nodes included in the wireless sensor network to obtain information for joining the wireless sensor network, specifically, a common channel where the CSMA scheme is used.

Figure 8:
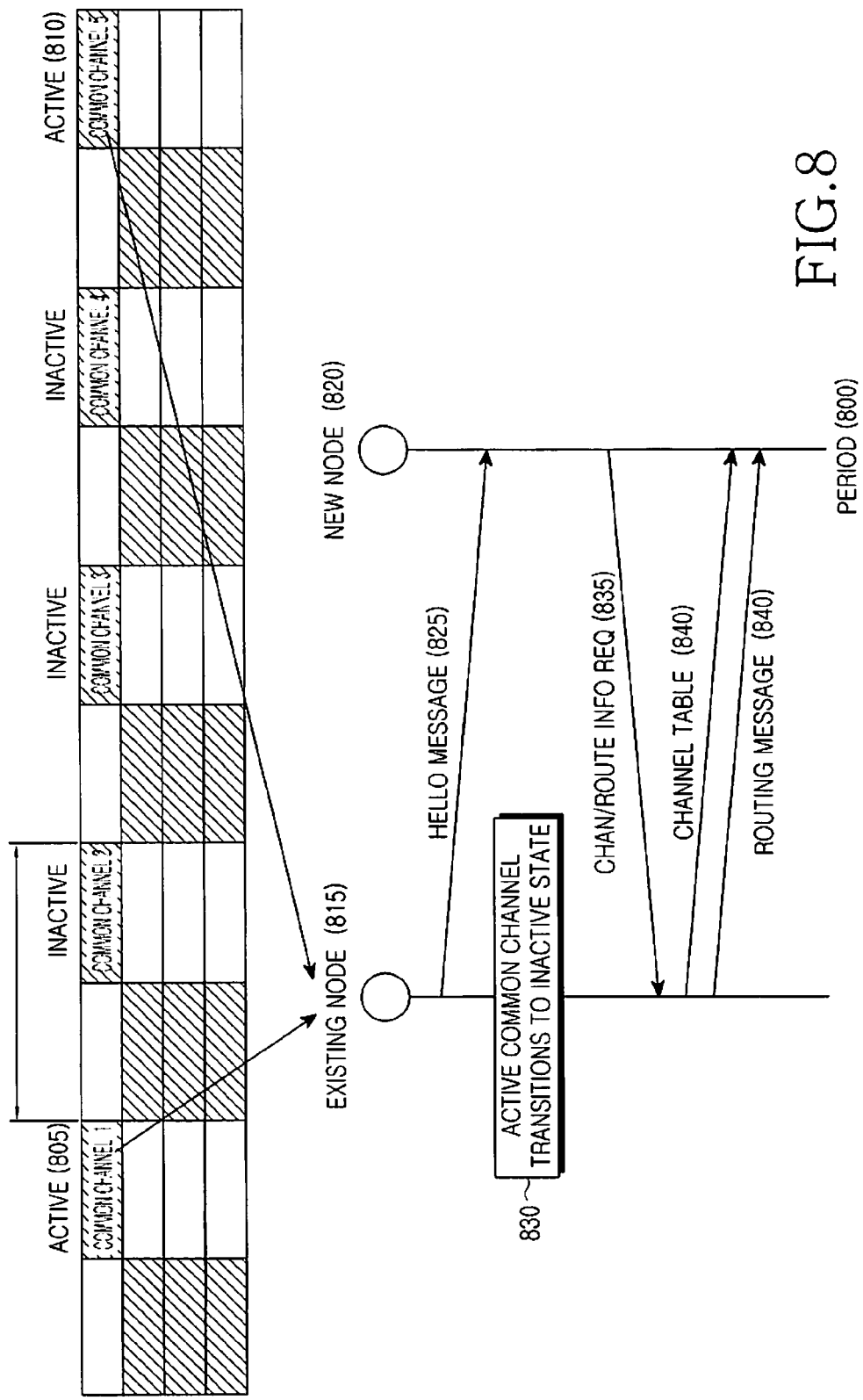
FIG. 8 is a diagram illustrating a communication method for joining a wireless sensor network during the main process in which all nodes included in the wireless sensor network transmit/receive packets by using a TDMA scheme, according to an embodiment of the present invention.

FIG. 8 is a diagram illustrating a communication method for a new node joining a wireless sensor network during the main process in which all nodes included in the wireless sensor network transmit/receive packets by using the TDMA scheme, according to an embodiment of the present invention.

Referring to FIG. 8, if a common channel for use of the CSMA scheme is active in each period 800, then energy consumption may be excessive. Thus, the common channel is active only once per predetermined number of periods. As an example, the common channel is active once every four periods. The active/inactive period of the common channel is the same in the overall wireless sensor network, but each node may use a differently set common channel.

For example, it is assumed that an existing node 815 uses common channels 1 and 5, 805 and 810. The existing node 815 is a node for which an optimized path has been already set in the wireless sensor network and which transmits/receives a packet to/from each node included in the wireless sensor network by using the TDMA scheme.

If the corresponding period arrives and common channel 1 805 or 5 810 is active, then the existing node 815 broadcasts a HELLO message indicating the start of the common channel 1 805 or 5 810 to its neighboring nodes in step 825. In step 830, when there is no response to the transmitted HELLO message for a given time, the existing node 815 determines that there is no new node desiring to join the wireless sensor network, and allows the active common channel 1 805 or 5 810 to transition to an inactive state.

If a new node 820 is to join the wireless sensor network of the existing node 815, then the new node 820 transmits a Channel/Route Info Request (CRIRQ) message to the existing node 815 in response to the HELLO message in step 835.

Upon receiving the CRIRQ message, the existing node 815 transmits a routing message including its channel table and its entry to the new node 820 in step 840.

After a give time has elapsed, the new node 820 obtains channel tables necessary for existing nodes in the wireless sensor network and routing messages for path acquisition through the above procedure of FIG. 8, thereby determining its parent node and being allocated a channel selected by its parent node. In this way, the new node 820 can join the wireless sensor network. Subsequently, the new node 820 also transmits exchange packets with the existing nodes over the allocated channel by using the TDMA scheme.

The process in which the new node 820 determines its parent node, confirms the channel of its parent channel, selects a channel for use with its child nodes, and then joins the wireless sensor network is the same as the initial network setting process. However, the new node 820 must use the common channel used by its parent node in order to communicate with the parent node. Thus, in order to transmit a JREQ message to the parent node, the new node 820 must wait until a HELLO message transmitted from its parent node over the common channel used by the parent node is received.

6. Path Recovery Step

If the battery power of any node is exhausted in the process of operating a wireless sensor network, then child nodes whose parent node is the node with exhausted battery power and all child nodes connected to the child nodes successively lose the path to their destination node, specifically, the sink node. Therefore, the child nodes whose parent node is lost must recover the path by selecting another parent node. This path recovery step is substantially the same as the above-described new node joining step. However, dissimilar to a new node, since a node that is to recover the path already has its channel table, it only needs to acquire the item values of its channel table entries by requesting its neighboring nodes to transmit routing messages over a common channel. When the above-described active/inactive period of the common channel is long, the node desiring to recover the path requires a long time to recover the path. Therefore, each node included in the wireless sensor network of the present invention transmits a signal to child nodes, indicating that the remaining energy of its battery is below a predetermined level, before its battery is exhausted. Also, when errors in time synchronization between neighboring nodes are out of an allowable range due to communicational problems or when communication using the TDMA scheme cannot be made due to other reasons, time synchronization can be recovered or the path can be reset through the same procedure as the above-described path recovery step.

7. Communication Step Using TDMA Scheme

Each node included in a wireless sensor network, for which time synchronization and channel allocation have been completed, can know when its channel and a channel allocated its parent node start. Specifically, since a parent node memorizes a slot allocated to each of its child nodes, it is possible for the parent node to know in which slot of the selected channel it exchanges a packet with each child node. Once the channel and slot of each node have been determined, when and in which physical channel a corresponding transmitting/receiving node communicates are determined. Thus, each parent/child node can communicate through the so-determined physical channel at the so-determined time. Even in a transmission slot where each node transmits a packet, each node maintains the transmission slot inactive when there is no packet to be transmitted. Contrarily, in a reception slot where each node receives a packet, each node must be always in a reception standby state because it cannot know whether or not there is a packet to be received. However, each node does not need to be in the reception standby state over all the time of the reception slot. Thus, when no packet is received for more than a given time corresponding to a part of the whole reception slot time, each node determines that the transmitting node has no packet to be transmitted, and returns to the inactive state again, so that energy consumption can be reduced.

Figure 9:
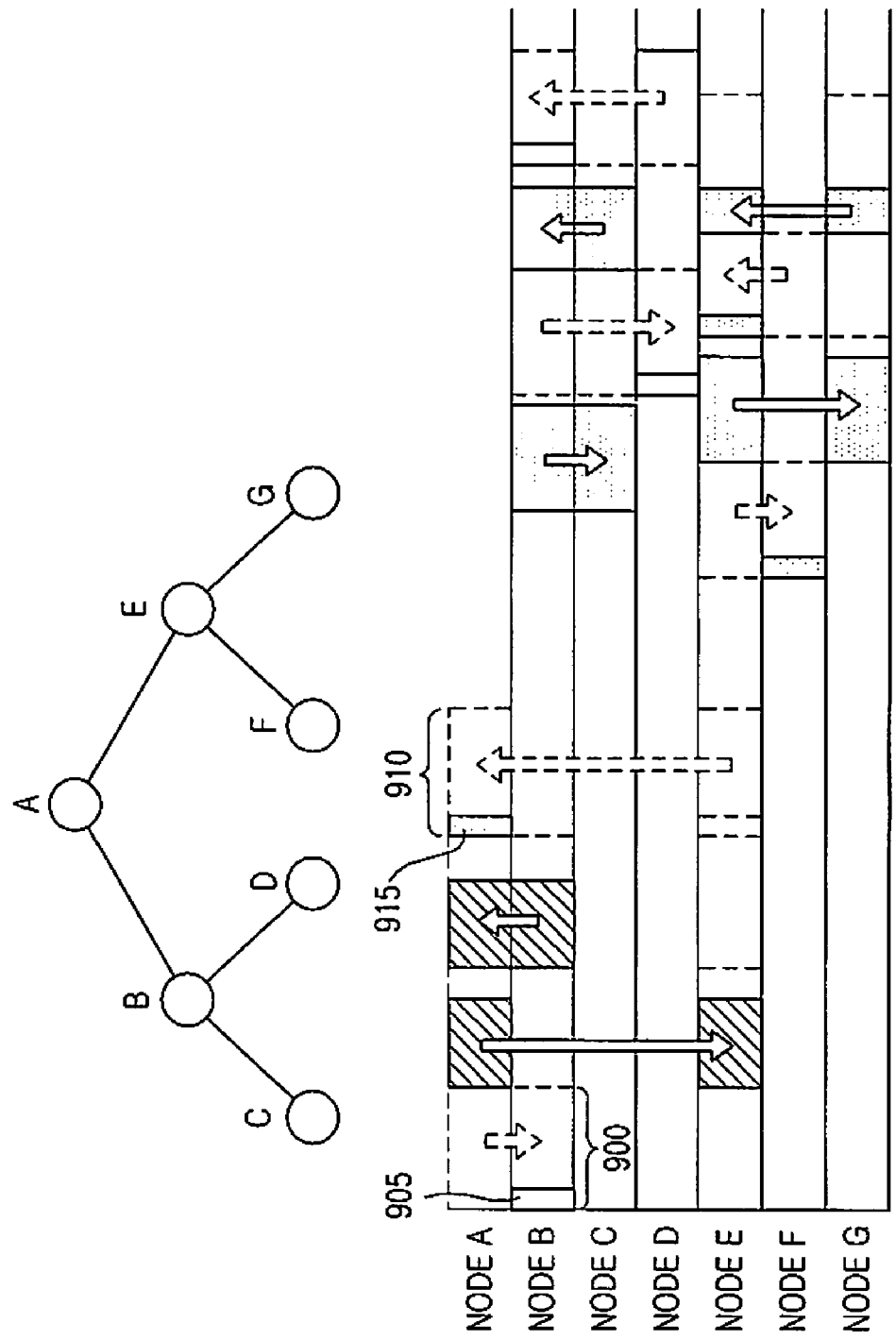
FIG. 9 is a diagram illustrating a scheme in which each node communicates by using a TDMA scheme in order to reduce energy consumption in a wireless sensor network, according to an embodiment of the present invention.

FIG. 9 is a diagram illustrating a scheme in which each node communicates by using a TDMA scheme in order to reduce energy consumption in a wireless sensor network, according to an embodiment of the present invention.

Referring to FIG. 9, the wireless sensor network includes a total of seven nodes. Node A has two child nodes, nodes B and E, node B as a parent node has two child nodes, nodes C and D, and node E as a parent node has two child nodes, nodes F and G. In FIG. 9, portions marked with diagonal lines represent a state where packet transmission actually occurs, and shaded portions represents a state where there is no actually transmitted packet and a reception node is in the reception standby state.

In the reception slot 900 of node B, node B waits for packet reception from node A for a given time 905, and then returns to the inactive state again when no packet is received from node A. Similarly, in the reception slot 910 of node A, node A waits for packet reception from node E for a given time 915, and then returns to the inactive state again when no packet is received from node E. Other nodes can also considerably reduce energy consumption by returning from the reception standby state to the inactive state when no packet is received in each reception slot for a given time.

As described above, the present invention can increase communication performance by using a TDMA scheme with relatively small collisions between respective nodes to transmit/receive packets in a wireless sensor network. Also, since the present invention uses the TDMA scheme in the wireless sensor network, each node can reduce unnecessary power consumption by waiting for packet reception for a set time in a corresponding slot and then transitioning to an inactive state when no packet is received even after the set time elapses.

While the invention has been shown and described with reference to a certain embodiments thereof, it will be understood by those skilled in the art that various changes in form and detail may be made therein without departing from the spirit and scope of the invention as defined by the appended claims and equivalents thereof.

What is claimed is:

1. A method for reducing power consumption in a wireless sensor network, the method comprising the steps of:

setting, by a first node, an optimized path destined for a sink node by using a common channel in which the first node and a second node use a Carrier Sense Multiple Access (CSMA) scheme;

setting, by the first node, a first channel for packet transmission/reception with child nodes of the first node, and allocating transmission slots for packet transmission to the child nodes of the first channel and reception slots for packet reception from the child nodes of the first node in the first channel;

transmitting, by the first node, a packet to the second node, which is allocated a first transmission slot among the transmission slots of the first channel, through the first transmission slot by using a Time Division Multiple Access (TDMA) scheme; and when a packet is not received from the second node, which is allocated a first reception slot among the reception slots of the first channel, through the first reception slot within a first set amount of time, allowing, by the first node, the first reception slot to transition to an inactive state, wherein the first node is one of at least one parent node connected to the sink node, and at least one child node connected to the at least one parent node, and the second node is a child node of the first node.

2. The method as claimed in claim 1, wherein setting the optimized path comprises:
generating, by the first node, an entry comprising a destination address, a hop count from the first node to the sink node, and a next node address to which a packet is transmitted from the first node in order to transfer the packet to the sink node;
broadcasting, by the first node, a routing message including the entry of the first node to neighboring nodes of the first node including the second node; and
receiving, by the second node, the routing message;
generating, by the second node, an entry recording
a destination address of the second node, set to the destination address of the first node, a hop count of the second node, set to a value of the hop count of the first node added by 1, and a next node address of the second node, set to an address of the first node; and
broadcasting, by the second node, a routing message including the entry of the second node to neighboring nodes of the second node.

3. The method as claimed in claim 2, further comprising:
when a routing message having a shorter path than a previously set path is not received from the any node within a second set amount of time, determining, by the second node, that an optimized path has been set;
transmitting, by the second node, a join request message requesting the first node to register the second node as a child node of the first node, to the first node; and
recoding, by the first node, the second node in a child node management table of the first node upon receiving the join request message, and transmitting a response message including information on the first channel and the transmission and reception slots to the second node in response to the join request message.

4. The method as claimed in claim 3, wherein the first channel comprises a logical channel having a name defined by a physical channel number and a column number indicating a set of logical channels using the same time interval within a predetermined TDMA period, wherein the first channel is different from channels allocated to the second node and nodes falling within an interference range corresponding to a predetermined hop count.

5. The method as claimed in claim 4, further comprising:
When setting the optimized path is completed, determining, by the second node, whether channel information for the first node exists in a channel table of the second node;
when the channel information for the first node exists confirming, by the second node, the channel information for the first node; and
when the channel information for the first node represents first channel information,
selecting, by the second node, a second channel having a channel name with a column number that is different from that of the name of the first channel, as a channel for communication with child nodes of the second node, from among channels absent in the channel table of the second node among all channels allocated in the wireless sensor network,
recording the selected second channel in the channel table of the second node, and
transmitting the channel table of the second node to the neighboring nodes of the second node,
wherein the channel table comprises entries of items corresponding to channel information for nodes falling within the interference range from the second node, and the items comprise a node address, a channel name, a hop count from the second node to a corresponding node address, and a serial number indicating an order of generation of channel information in the channel table.

6. The method as claimed in claim 5, further comprising:
when battery energy of the first node is below a threshold value or an error in time synchronization is out of an allowable range, transmitting, by the first node, a path deviation warning signal to the child nodes of the first node including the second node; and
resetting, by each of the child nodes of the first node, including the second node, the optimized path by receiving routing messages from neighboring nodes of the child nodes of the first node, based on the channel table of each child node, upon receiving the path deviation warning signal.

7. The method as claimed in claim 5, further comprising:
when the channel information for the first node does not exist in the channel table of the second node, selecting, by the second node, a third channel having a channel name with a column number that differs from that of the name of the first channel, as a channel for the second node, from among the channels that are absent in the channel table of the second node among all the channels allocated in the wireless sensor network, and recording the selected third channel in the channel table of the second node;
when the first channel information is received after the third channel is selected, checking, by the second node, when a column number included in the name of the first channel is the same as that included in the name of the third channel; and
when the column numbers are the same:
selecting, by the second node, a channel having a channel name with a column number different from that of the name of the first channel, as a channel for the second channel, from among the channels that are absent in the channel table of the second node among all the channels allocated in the wireless sensor network,
recording the selected channel in the channel table of the second node, and
transmitting the channel table of the second node to the neighboring nodes of the second node.

8. The method as claimed in claim 7, further comprising:
receiving the channel table of the second node by a third node that is one of the child nodes of the second node;
comparing, by the third node, a hop count item value of each entry included in the channel table of the second node with the interference range;
when a fourth entry in the channel table of the second node has a hop count item value less than the interference range, determining, by the third node, whether an entry having the same node address as a fourth node address included in the fourth entry exists in a channel table of the third node;
when the entry having the same node address does not exist, updating, by the third node, the channel table of the third node with a value of a hop count item value of the fourth entry added by 1;
when a fifth entry having the same node address exists as the fourth node address exists in the channel table of the third node, comparing, by the third node, a serial number item value of the fifth entry with that of the fourth entry;

when the serial number item value of the fourth entry is greater than that of the fifth entry, updating, by the third node, each item value of the fifth entry with that of the fourth entry; and when the serial number item value of the fourth entry is the same as that of the fifth entry, selecting, by the third node, the fourth entry, and updating each item value of the fifth entry included in the channel table of the third node with that of the fourth entry.

9. The method as claimed in claim 8, further comprising, when an entry having the same channel name as a channel name included in an entry of the third node exists in the channel table of the second node after the third node receives the channel table of the second node, changing, by a corresponding node, the node's channel, the corresponding node having a larger node address item value among the entries having the same channel name.

10. The method as claimed in claim 3, wherein setting the optimized path comprises:
when the first node recognizes a fourth node as a parent node of the first node, waiting for reception of a routing message for a third set amount of time;
when the routing message is not received within the third set amount of time, fixing, by the first node, the child nodes of the first node;
determining, by the first node, whether the first node is synchronized with the fixed child nodes of the first node;
when the first node is synchronized with the fixed child nodes of the first node, transmitting, by the first node, a TDMA scheme ready message to each of the synchronized child nodes of the first node, wherein the TDMA scheme ready message informs the synchronized child nodes of the first node that the synchronized child nodes of the first node can receive packets through the first channel using the TDMA scheme;
determining, by each of the synchronized child nodes of the first node, whether fifth nodes as child nodes of each synchronized child node of the first node exist, and when the fifth nodes of each synchronized child node exist, determining, by each synchronized child node of the first node, if the fifth nodes of each synchronized child node are fixed to each synchronized child node of the first node and are synchronized with each synchronized child node of the first node; and
when the fifth nodes are fixed to each synchronized child node of the first node and are synchronized with each synchronized child node of the first node, transmitting, by each of the synchronized fifth nodes, a TDMA scheme start message to the first node.

11. The method as claimed in claim 10, further comprising, when the routing message is received during the third set amount of time or the first node is not synchronized with the fixed child nodes of the first node, performing, by the first node, communication for packet reception from a new child node through the common channel using the CSMA scheme.

12. The method as claimed in claim 11, wherein, on receiving the TDMA scheme ready message, each of the synchronized fifth nodes communicates with child nodes of each of the synchronized fifth nodes through the common channel using the CSMA scheme; and
wherein the common channel exists in each TDMA period, and is active once per predefined number of periods.

13. The method as claimed in claim 12, further comprising:
broadcasting, by the first node, a notification message to the neighboring nodes of the first node, which informs the neighboring nodes of the first node that the common channel is active; and
when the first node receives responses to the notification message from the fifth nodes, transmitting a channel table and a routing message of the first node to the fifth nodes,
wherein the channel table comprises entries of items corresponding to channel information for nodes falling within the interference range from the first node, and the items comprise a corresponding node address, a corresponding channel name, a hop count from the first node to the corresponding node address, and a serial number indicating an order of generation of channel information in the channel table.

14. The method as claimed in claim 1, wherein the common channel is broadcasted from the sink node, or is recognized in advance by all nodes included in the wireless sensor network, and a physical channel using the TDMA scheme is not arranged in a column in which the common channel exists; and
wherein the column denotes a set of logical channels using the same time interval within a predetermined TDMA period.

* * * * *